May 24, 1932. E. ROLSHOVEN 1,859,472
RAIL JOINT
Filed June 20, 1931 2 Sheets-Sheet 1

Inventor:
Edward Rolshoven

May 24, 1932.  E. ROLSHOVEN  1,859,472
RAIL JOINT
Filed June 20, 1931  2 Sheets-Sheet 2
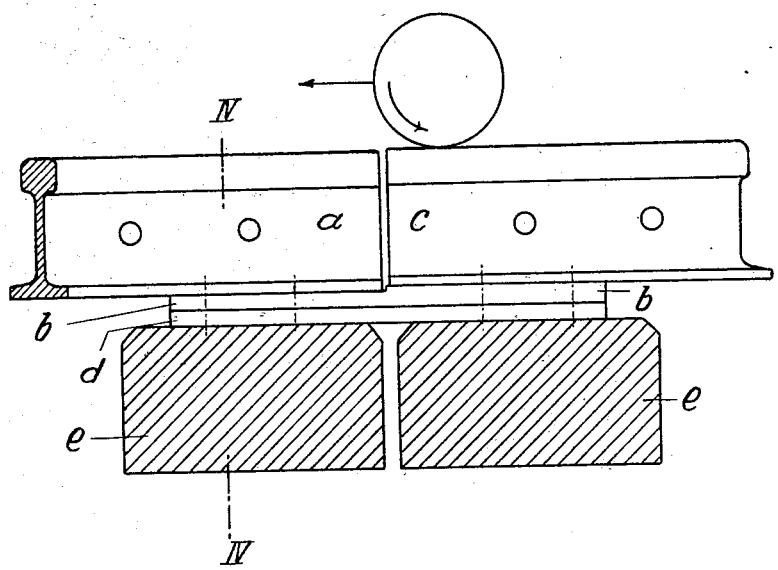
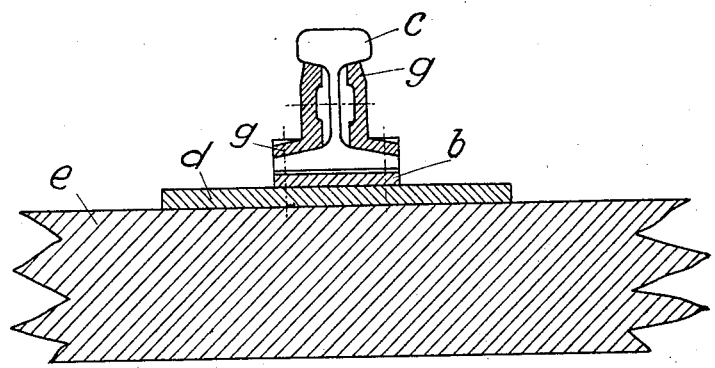
Inventor:
Edvard Rolshoven Patented May 24, 1932

1,859,472

UNITED STATES PATENT OFFICE

EDUARD ROLSHOVEN, OF UETERSEN, GERMANY

RAIL JOINT

Application filed June 20, 1931, Serial No. 545,694, and in Germany July 8, 1930.

The object of the present invention is to produce a rail joint for railroads which not only ensures a shockless transition of the wheels from one rail to another but which is also secured against the removal of the fish plates, and the invention consists essentially in supporting the abutting rail ends on a plate which is rigidly secured to the foot of the facing rail so as to prevent the tread at the end of the trailing rail from being depressed below that of the facing rail, said supporting plate being itself supported on a bridge plate resting on two sleepers.

For connecting the rail ends angle fish plates are used which bear against the head and foot of each rail and which are secured to the supporting plate and a bridge plate by vertical bolts the heads of which are concealed between the bridge plate and the sleepers so as to prevent the bolts from being withdrawn.

Preferably the tread of the trailing rail is normally maintained at a slightly higher level than that of the facing rail so as to ensure a shockless transition of the wheels over the gaps even if the joint should be loose.

Figure 1:
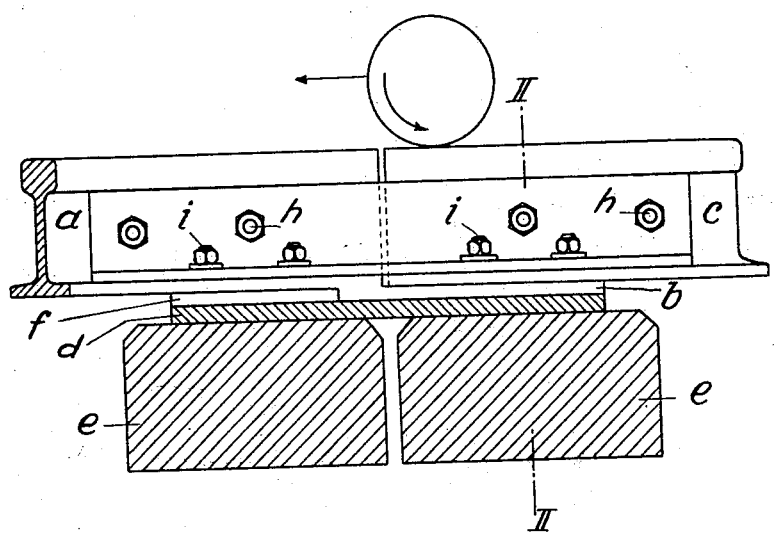
Figure 2:
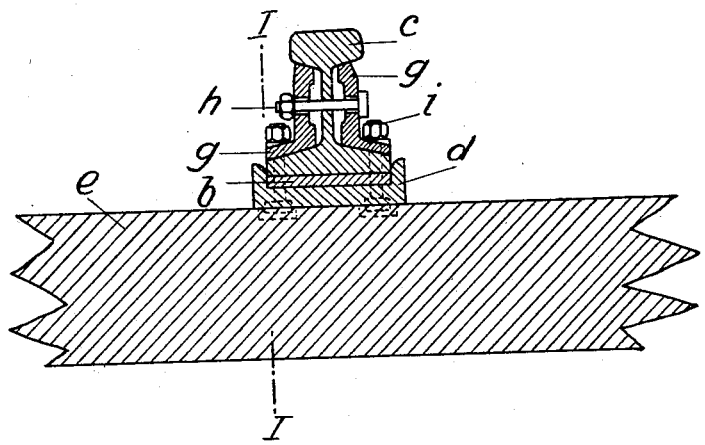

Fig. 1 of the accompanying drawings represents a side view of a rail joint according to the invention in section on the line I—I of Fig. 2, Fig. 2 is a cross section on the line II—II of Fig. 1, Fig. 3 is a side view of a modified joint, and Fig. 4 is a cross section on the line IV—IV of Fig. 3.

The rail joint comprises a supporting plate $b$ which is rigidly secured to the foot of the facing rail $a$ by welding or in any other suitable manner and which takes the thrust of the trailing rail $c$ and prevents the tread of the latter from being depressed beyond that of the facing rail. The supporting plate may be incorporated with the foot of the rail as shown in Fig. 1 and formed with an offset portion for the reception of the trailing rail, the lower bearing surface being evened out, either by means of a packing piece $f$ or by making this portion of the plate thicker. A pair of sleepers $e$ is arranged under the joint, and a bridge plate $d$ is interposed between the sleepers and the supporting plate $b$.

For connecting the rail ends together, a pair of angle fish plates $g$ are employed which are adapted to bear against the head and foot of each rail. Fish bolts $h$ are passed through the vertical flanges of the fish plates and through the rail web in the usual manner, and additional security is obtained by means of vertical fastening bolts $i$ which are passed upwards through the plates $d$ and $b$, through the foot of the rail and through the horizontal flanges of the fish plates. The heads of the bolts $i$ are recessed into the sleepers, and as the bolts cannot be withdrawn, the removal of the fish plates, even if the nuts should be removed, is impossible.

In the arrangement according to Figs. 3 and 4 the supporting plate $b$ is adapted to maintain the trailing rail $c$ with its tread on a slightly higher level than that of the facing rail. This arrangement has the advantage of preventing the tread of the rail $a$ from projecting beyond that of the rail $c$ even if the joint should get loose. The drop of the wheels from one rail to the other while the joint remains rigid, will not tend to produce any shocks.

The plates $b$ and $d$ may be combined into a single bridge plate, and the difference in level between the two rail ends can be produced either by recessing this plate or by interposing a packing piece between it and the trailing rail.

I claim:

1. A rail joint for railroads, comprising a supporting plate for the abutting ends of the rails, said plate being rigidly secured to the foot of the facing rail and adapted to maintain the tread of said rail on a lower level than that of the trailing rail, a pair of sleepers arranged under the supporting plate, and a bridge plate interposed between said sleepers and the supporting plate.

2. A rail joint as claimed in claim 1 wherein the difference in tread levels is obtained by making the free portion of the supporting plate thicker than the fastened portion thereof.

3. A rail joint for railroads comprising a sleeper arranged under each rail end, and a bridge plate interposed between said sleepers and the rail ends, said bridge plate adapted to maintain the tread of the trailing rail on a higher level than that of the facing rail.

4. A rail joint as claimed in claim 3 wherein the difference in tread level is obtained by means of a packing piece interposed between the bridge plate and the trailing rail.

5. A rail joint for railroads comprising a supporting plate for the abutting ends of the rails, said plate being rigidly secured to the foot of the facing rail, a pair of sleepers arranged under the supporting plate, a bridge plate interposed between the sleepers and the supporting plate, angle fish plates bearing against the head and foot of each rail, fish bolts engaging the vertical flanges of the fish plates, and vertical fastening bolts passed upwards through the plates, through the rail foot and through the horizontal flanges of the fish plates, the heads of said fastening bolts being recessed into the sleepers.

6. A rail joint as claimed in claim 5 wherein the tread of the trailing rail is maintained on a higher level than that of the facing rail.

EDUARD ROLSHOVEN.